(12) United States Patent
Huang et al.

(10) Patent No.: US 11,501,574 B2
(45) Date of Patent: Nov. 15, 2022

(54) MULTI-PERSON POSE RECOGNITION METHOD AND APPARATUS, ELECTRONIC DEVICE, AND STORAGE MEDIUM

(71) Applicant: Tencent Technology (Shenzhen) Company Limited, Guangdong (CN)

(72) Inventors: Haozhi Huang, Shenzhen (CN); Xinyu Gong, Shenzhen (CN); Jingmin Luo, Shenzhen (CN); Xiaolong Zhu, Shenzhen (CN); Wei Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 180 days.

(21) Appl. No.: 17/073,441

(22) Filed: Oct. 19, 2020

(65) Prior Publication Data

US 2021/0073527 A1 Mar. 11, 2021

Related U.S. Application Data

(63) Continuation of application No. PCT/CN2019/113899, filed on Oct. 29, 2019.

(30) Foreign Application Priority Data

Oct. 30, 2018 (CN) .......................... 201811275350.3

(51) Int. Cl.
*G06V 40/20* (2022.01)
*G06T 7/73* (2017.01)
(Continued)

(52) U.S. Cl.
CPC ................ *G06V 40/20* (2022.01); *G06T 7/73* (2017.01); *H04L 12/4675* (2013.01);
(Continued)

(58) Field of Classification Search
CPC .... H04W 68/02; H04W 4/021; G06V 40/166; H04N 21/41407; H04N 21/44209;
(Continued)

(56) References Cited

U.S. PATENT DOCUMENTS 9,509,990 B2 11/2016 Rossato et al.
9,881,234 B2 * 1/2018 Huang ................. G06V 10/454
(Continued)

FOREIGN PATENT DOCUMENTS

CN 104641643 5/2015
CN 107731011 2/2018
(Continued)

OTHER PUBLICATIONS

Newell Alejandro et al : Stacked Hourglass Networks for Human Pose Estimation, XP055861019 (Year: 2016).*
(Continued)

*Primary Examiner* — Asghar H Bilgrami
(74) *Attorney, Agent, or Firm* — ArentFox Schiff LLP

(57) ABSTRACT

In a multi-person pose recognition method, a to-be-recognized image is obtained, and a circuitous pyramid network is constructed. The circuitous network pyramid includes parallel phases, and each phase includes downsampling network layers, upsampling network layers, and a first residual connection layer to connect the downsampling and upsampling network layers. The phases are interconnected by a second residual connection layer. The circuitous pyramid network is traversed, by extracting a feature map for each phase, and the feature map of the last phase is determined to be the feature map of the to-be-recognized image. Multi-pose recognition is then performed on the to-be-recognized image according to the feature map to obtain a pose recognition result for the to-be-recognized image.

16 Claims, 9 Drawing Sheets

(51) Int. Cl.

| | |
|---|---|
| *H04L 12/46* | (2006.01) |
| *H04L 61/103* | (2022.01) |
| *H04L 67/125* | (2022.01) |
| *H04L 69/325* | (2022.01) |
| *H04N 19/126* | (2014.01) |
| *H04N 19/543* | (2014.01) |
| *H04N 19/55* | (2014.01) |
| *H04N 19/59* | (2014.01) |
| *H04N 19/70* | (2014.01) |
| *H04N 19/87* | (2014.01) |
| *G06V 10/44* | (2022.01) |
| *G06V 10/80* | (2022.01) |
| *G06V 10/82* | (2022.01) |

(52) U.S. Cl.
CPC .......... *H04L 61/103* (2013.01); *H04L 67/125* (2013.01); *H04L 69/325* (2013.01); *H04N 19/126* (2014.11); *H04N 19/543* (2014.11); *H04N 19/55* (2014.11); *H04N 19/59* (2014.11); *H04N 19/70* (2014.11); *H04N 19/87* (2014.11); *G06T 2207/30196* (2013.01)

(58) Field of Classification Search
CPC ........... H04N 21/4524; H04N 21/4532; H04N 21/4882; H04N 21/426; H04N 21/4223; H04N 21/43615; H04N 21/44218; H04N 21/44222; H04N 21/44227; H04N 21/4755; H04N 21/478; H04N 21/8126
See application file for complete search history.

(56) References Cited

U.S. PATENT DOCUMENTS

| | | | |
|---|---|---|---|
| 9,961,345 B2 | 5/2018 | Rossato et al. | |
| 10,178,387 B2 | 1/2019 | Rossato et al. | |
| 11,074,711 B1 * | 7/2021 | Akbas | ..................... G06N 3/08 |
| 2013/0322537 A1 | 12/2013 | Rossato et al. | |
| 2017/0310968 A1 | 10/2017 | Rossato et al. | |
| 2019/0297322 A1 | 9/2019 | Rossato et al. | |

FOREIGN PATENT DOCUMENTS

| | | |
|---|---|---|
| CN | 108062543 | 5/2018 |
| CN | 108229445 | 6/2018 |
| CN | 110163059 | 8/2019 |

OTHER PUBLICATIONS

Wei Yang el al: "Learning Feature Pyramids for Human Pose Estimation", ARVIX.ORG, Cornell University Library, 201 Olin Library Cornell University Ithaca, NY, 148853, XP080951269 (Year: 2017).*

Extended European Search Report dated Nov. 23, 2021 in European Application No. 19878618.8.

Communication Pursuant to Rules 70(2) and 70a(2) dated Dec. 10, 2021 in European Application No. 19878618.8.

Newell, et al. "Stacked Hourglass Networks for Human Pose Estimation", XP055861019, Sep. 17, 2016, https://link.springer.com/content/pdf/10.1007/978-3-319-46484-8_29.pdf, pp. 483-499.

Yang, et al. "Learning Feature Pyramids for Human Pose Estimation", XP080951269, Arxiv.org, Cornell University Library, Aug. 3, 2017, 10 pages.

Zhang, et al. "Dilated Hourglass Networks for Human Pose Estimation", 2018 Chinese Automation Congress (CAC), IEEE, XP033506250, Nov. 30, 2018, pp. 2597-2602.

International Search Report dated Feb. 1, 2020 in PCT Application No. PCT/CN2019/113899 (with English Translation).

Written Opinion dated Feb. 1, 2020 in PCT Application No. PCT/CN2019/113899.

Kaiming He, et al. "Identity Mappings in Deep Residual Networks", Microsoft Research, arXiv:1603.05027v3[cs.CV], Jul. 25, 2016, 15 pages.

Alejandro Newell et al. "Associative Embedding: End-to-End Learning for Joint Detection Grouping", 31$^{st}$ Conference on Neural Information Processing Systems (NIPS 2017), 2017, 11 pages.

Liang-Chieh Chen et al. "Encoder-Decoder with Atrous Separable Convolution for Semantic Image Segmentation", Computer Vision Foundation, ECCV 2018, 18 pages.

* cited by examiner

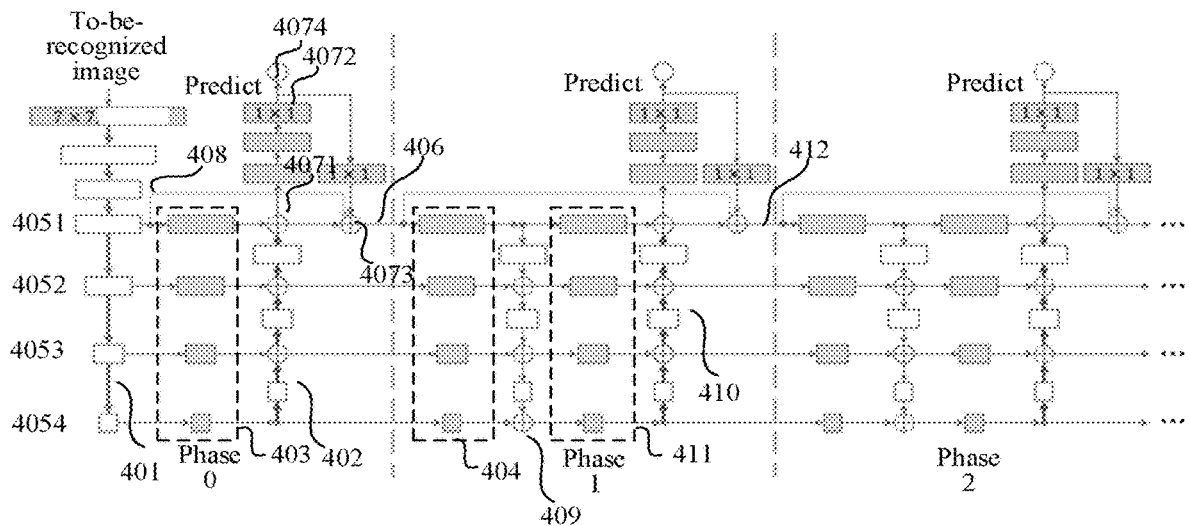

Perform feature extraction on an input feature map of the current phase through the layers of the downsampling network

333

Transmit, through the first residual connection layer, an extracted feature from the layers of the downsampling network to the layers of the upsampling network, and perform feature fusion on the layers of the upsampling network to obtain the output feature map

FIG. 5

MULTI-PERSON POSE RECOGNITION METHOD AND APPARATUS, ELECTRONIC DEVICE, AND STORAGE MEDIUM

RELATED APPLICATION

This application is a continuation of International Application No. PCT/CN2019/113899, filed on Oct. 29, 2019, which claims priority to Chinese Patent Application No. 201811275350.3, entitled "MULTI-PERSON POSE RECOGNITION METHOD AND APPARATUS, ELECTRONIC DEVICE, AND STORAGE MEDIUM" and filed on Oct. 30, 2018. The entire disclosures of the prior applications are hereby incorporated by reference in their entirety.

FIELD OF THE TECHNOLOGY

This application relates to the field of computer technologies including a pose recognition method and apparatus, an electronic device, and a storage medium.

BACKGROUND OF THE APPLICATION

At present, multi-person pose recognition technology includes two solutions: top-down recognition and bottom-up recognition. In the solution of top-down recognition, each person in a to-be-recognized image needs to be first detected in a form of a bounding box, and human body key point detection is then performed on each person in the bounding box. In the solution of bottom-up recognition, human body key points of all people in the to-be-recognized image are detected at one time, and a person to which each human body key point belongs is determined at the same time. Compared with the solution of top-down recognition, the solution of bottom-up recognition has higher processing efficiency but insufficient precision.

Therefore, a multi-person pose recognition method based on a stacked hourglass network is provided, to make up for insufficient precision in the solution of bottom-up recognition. However, in this stacked hourglass network, feature propagation depends on a convolution operation, forming the bottleneck of the feature propagation.

SUMMARY

Exemplary aspects include a multi-person pose recognition method that is performed by an electronic device, and in which a to-be-recognized image is obtained. A circuitous pyramid network, the circuitous pyramid network comprising plural phases connected in parallel is constructed. Each phase includes layers of a downsampling network, layers of an upsampling network and a first residual connection layer connected between the layers of the upsampling network and the layers of the downsampling network. Different phases being connected through a second residual connection layer. The plural phases of the circuitous pyramid are traversed. To traverse the circuitous pyramid, feature propagation between the layers of the downsampling network and the layers of the upsampling network in a current phase is performed, during feature map extraction in the current phase, through the first residual connection layer to obtain an output feature map of the current phase. Feature propagation between the layers of the upsampling network in the current phase and the layers of the downsampling network in a next phase is performed through the second residual connection layer to extract a feature map corresponding to the next phase. An output feature map of a last phase is determined as a feature map corresponding to the to-be-recognized image until traversal of the phases in the circuitous pyramid network is completed. Multi-person pose recognition is performed according to the feature map corresponding to the to-be-recognized image to obtain a pose recognition result for the to-be-recognized image.

Exemplary aspects also include a multi-person pose recognition apparatus having processing circuitry that obtains a to-be recognized image, and constructs a circuitous pyramid network. The circuitous pyramid network includes plural phases connected in parallel. Each phase includes layers of a downsampling network, layers of an upsampling network, and a first residual connection layer connected between the layers of the upsampling network and the layers of the downsampling network. Different phases are connected through a second residual connection layer. The processing circuitry traverses the phases of the circuitous pyramid network, and to do so, performs the following steps. In a first step, during feature map extraction performed in a current phase, feature propagation between the layers of the down sampling network and the layers of the upsampling network in the current phase is performed through the first residual connection layer to obtain an output feature map of the current phase. In a second step, feature propagation between the layers of the upsampling network in the current phase and the layers of the downsampling network in a next phase is performed through the second residual connection layer to extract a feature map corresponding to the next phase. An output feature map of a last phase is then used as a feature map corresponding to the to-be-recognized image until traversal of the phases in the circuitous pyramid network is completed. Multi-person pose recognition is then performed according to the feature map corresponding to the to-be-recognized image to obtain a pose recognition result for the to-be-recognized image.

Exemplary aspects further include a non-transitory computer-readable medium encoded with computer-readable instructions that, when executed by processing circuitry, cause the processing circuitry to perform a method in which a to-be-recognized image is obtained, and a circuitous pyramid network is constructed. The circuitous pyramid network includes plural phases connected in parallel, and each phase includes layers of a downsampling network, layers of an upsampling network, and a first residual connection layer connected between the layers of the upsampling network and the layers of the downsampling network. Different phases are connected through a second residual connection layer. The plural phases of the circuitous pyramid network are traversed by the following steps. In a first step, during feature map extraction performed in a current phase, feature propagation between the layers of the downsampling network and the layers of the upsampling network in the current phase is performed through the first residual connection layer to obtain an output feature map of the current phase. In a second step, feature propagation between the layers of the upsampling network in the current phase and the layers of the downsampling network in a next phase is performed through the second residual connection layer to extract a feature map corresponding to the next phase. Then an output feature map of a last phase is used as a feature map corresponding to the to-be-recognized image, until traversal of the phases in the circuitous pyramid network is completed. Multi-person pose recognition is then performed according to the feature map corresponding to the to-be-recognized image to obtain a pose recognition result for the to-be recognized image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a schematic structural diagram of a circuitous pyramid network according to the exemplary embodiment corresponding to FIG. 3.

FIG. 5 is a flowchart of step 340 in the embodiment corresponding to FIG. 3 in an embodiment of the present disclosure.

DETAILED DESCRIPTION

Exemplary embodiments are described in detail herein, and examples of the exemplary embodiments are shown in the accompanying drawings. When the following descriptions relate to the accompanying drawings, unless otherwise indicated, same numbers in different accompanying drawings represent same or similar elements. The implementations described in the following exemplary embodiments do not represent all implementations that are consistent with the present disclosure. On the contrary, the implementations are merely examples of apparatuses and methods consistent with those described in detail in the appended claims and some aspects of the present disclosure.

The exemplary embodiments of the present disclosure provide a multi-person pose recognition method, and resolve the problem of the bottleneck of feature propagation, thereby effectively improving precision of pose recognition. Correspondingly, the multi-person pose recognition method is applicable to a multi-person pose recognition apparatus, and the multi-person pose recognition apparatus is deployed in an electronic device with a Von Neumann architecture, for example, the electronic device may be a user terminal, a server, or the like.

Figure 1:
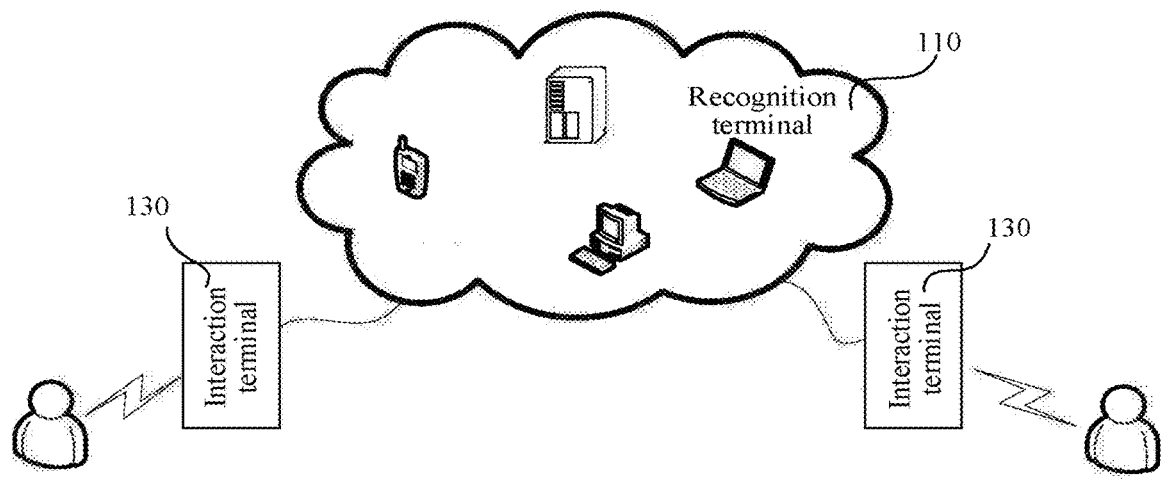
FIG. 1 is a schematic diagram of an implementation environment according to an exemplary embodiment of the present disclosure.

FIG. 1 is a schematic diagram of an exemplary implementation environment according to a pose recognition method. The implementation environment includes a recognition terminal 110 and an interaction terminal 130.

The recognition terminal 110 may be a desktop computer, a notebook computer, a tablet computer, a smartphone, a palmtop computer, a personal digital assistant or another electronic device on which a pose recognition apparatus can be deployed, for example, a server that provides a pose recognition service for a user. The recognition terminal 110 may also be other devices not listed herein without departing from the scope of the present disclosure.

The interaction terminal 130 is an electronic device that may realize somatosensory interaction with the user such as a somatosensory device or a smart home device. The interaction terminal 130 is deployed at the same gateway with the recognition terminal 110 through 2G/3G/4G/5G, Wi-Fi and other communication modes, so that the somatosensory interaction between the user and the interaction terminal 130 is realized.

For the recognition terminal 110, after a to-be-recognized image is obtained, a circuitous pyramid network may be used for performing the pose recognition on the to-be-recognized image, to obtain a pose recognition result of the to-be-recognized image.

It is worth mentioning that when the recognition terminal 110 is a server, the to-be-recognized image obtained by the server may be from a camera device deployed in an environment where the user performs actions, and the camera device may acquire, in real time, images or videos of the user performing actions, and further upload the acquired images or videos to the server.

Further, according to the pose recognition result of the to-be-recognized image, an action in the to-be-recognized image is recognized to generate a corresponding interaction instruction, thereby controlling execution of a specified event through the interaction instruction.

For example, if the interaction terminal 130 is a smart speaker, with interaction between the recognition terminal 110 and the smart speaker, the smart speaker may receive the interaction instruction, thereby executing the specified event according to the interaction instruction. For example, if the specified event is a starting event, when the actions performed by the user conform to a specified pose, the smart speaker is started for the user.

Certainly, according to actual needs of an application scenario, in another implementation environment, the pose recognition apparatus may alternatively be directly deployed on the interaction terminal 130, that is, the interaction terminal 130 also serves as a recognition terminal.

Specifically, after obtaining the to-be-recognized image, the interaction terminal 130 performs pose recognition on the to-be-recognized image, thereby executing the specified event through the pose recognition result of the to-be-recognized image. For example, if the interaction terminal 130 is a dancing machine, it is recognized whether the user performs a series of specified dance actions in sequence, through recognizing whether the series of actions performed by the user match specified dance actions, thereby generating an interaction instruction, and executing a scoring event according to the interaction instruction, that is, scoring actions performed by the user.

Figure 2:
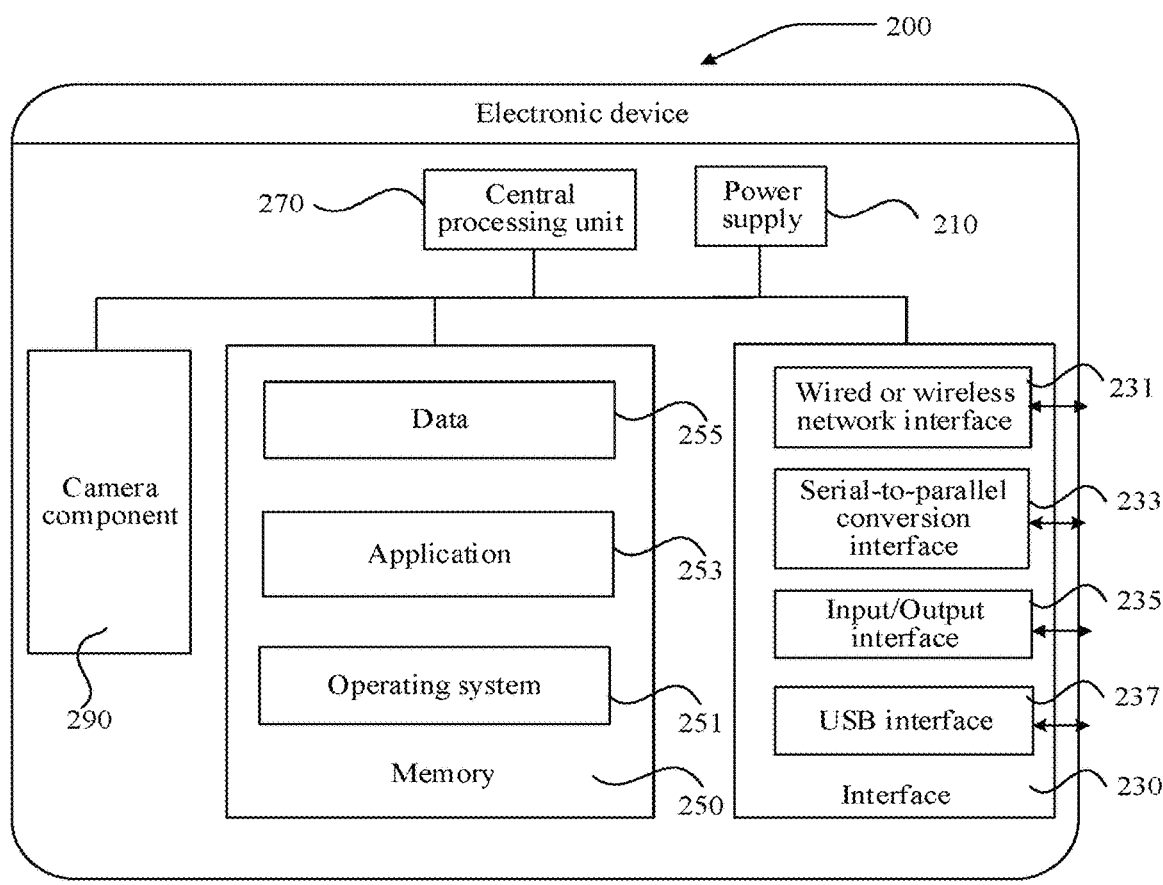
FIG. 2 is a structural block diagram of hardware of an electronic device according to an exemplary embodiment of the present disclosure.

FIG. 2 is a structural block diagram of hardware of an electronic device according to an exemplary embodiment. The electronic device is applicable to the recognition terminal 110 in the implementation environment shown in FIG. 1, and may be a user terminal such as a desktop computer, a notebook computer, a tablet computer, a palmtop computer, a personal digital assistant, a smartphone, or a wearable device, or a serving end such as a server.

The electronic device is merely an example adapted to this application, and cannot be considered as providing any limitation to a use range of the present disclosure. The electronic device cannot be explained as needing to reply on or needing to have one or more components in the exemplary electronic device 200 shown in FIG. 2.

The hardware structure of the electronic device 200 may have a large difference due to different configurations or performance. As shown in FIG. 2, the electronic device 200 includes circuitry, such as a power supply 210, an interface 230, at least one memory 250, at least one central processing unit (CPU) 270 and a camera component 290. Specifically, the power supply 210 is configured to provide working voltages for various components on the electronic device 200

The interface 230 includes at least one wired or wireless network interface 231, at least one serial-to-parallel conversion interface 233, at least one input/output interface 235, at least one USB interface 237, and the like, and is configured to communicate with an external device. For example, the interface interacts with the interaction terminal 130 in the implementation environment shown in FIG. 1.

The memory 250, as a resource storage carrier, may be a read-only memory, a random access memory, a magnetic disk, an optical disk, or the like. The resources stored on the memory 250 include an operating system 251, an application 253, data 255, and the like, and a storage manner may be ephemeral storage or permanent storage.

The operating system 251 is configured to manage and control various components and the application 253 on the electronic device 200, so that calculation and processing of massive data 255 by the CPU 270 may be implemented, and the operating system 251 may be Windows Server™, Mac OS X™, Unix™, Linux™, FreeBSD™ and the like.

The application 253 is a computer program that completes at least one specific task based on the operating system 251, and may include at least one module (not shown in FIG. 2), and each module may include a series of computer-readable instructions to the electronic device 200. For example, the multi-person pose recognition apparatus may be regarded as the application program 253 deployed on the electronic device 200, to implement the multi-person pose recognition method. The data 255 may be a photo, a picture, or the to-be-recognized image, and is stored in the memory 250.

The CPU 270 may include one or more processors, and is configured to communicate with the memory 250 through a communication bus to read the computer-readable instructions stored in the memory 250, thereby implementing the calculation and processing of the massive data 255 in the memory 250. For example, the multi-person pose recognition method may be completed by the CPU 270 by reading a series of computer-readable instructions stored in the memory 250.

The camera component 290, such as a camera, is configured to capture an image or a video. The captured image or video may be stored in the memory 250, and may further communicate with an external device through the interface 230. For example, the images or videos when the user performs actions are acquired in real time.

In addition, the features described in the present disclosure may further be implemented through a hardware circuit or a hardware circuit in combination with software. Therefore, implementation of the features of the present disclosure is not limited to any specific hardware circuit, software and combination of the hardware circuit and the software.

Figure 3:
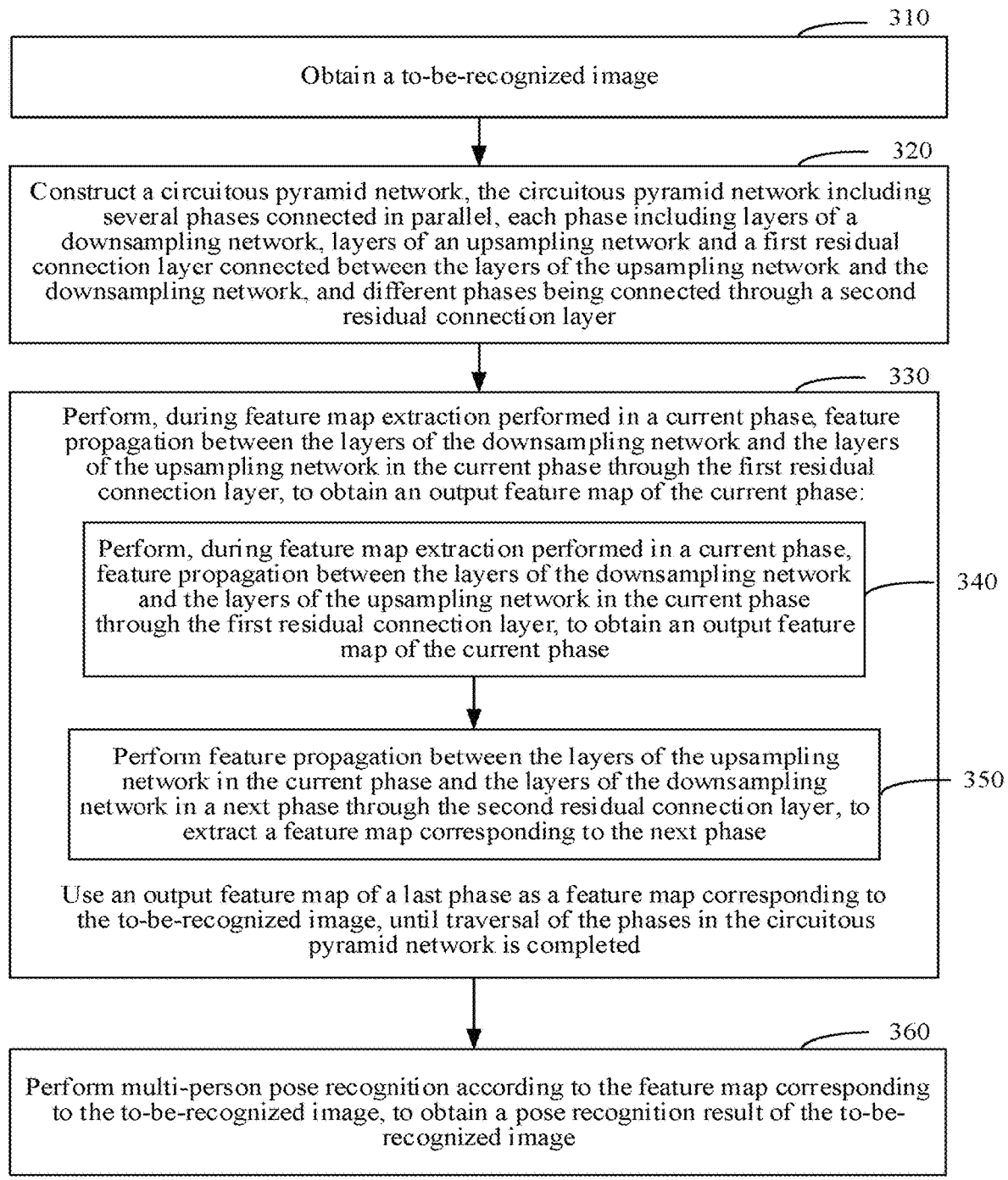
FIG. 3 is a flowchart of a multi-person pose recognition method according to an exemplary embodiment of the present disclosure.

Referring to FIG. 3, in an exemplary embodiment, a multi-person pose recognition method is applied to an electronic device, for example, a recognition terminal applied to the implementation environment shown in FIG. 1. A structure of the recognition terminal may be shown in FIG. 2.

The multi-person pose recognition method may be performed by the recognition terminal, or may be understood as being performed by a multi-person pose recognition apparatus deployed in the recognition terminal. In the following exemplary method embodiments, for ease of description, description is provided by using an example in which an execution body of each step is the multi-person pose recognition apparatus. This is not specifically limited.

The multi-person pose recognition method may include the following steps. In step 310, a to-be-recognized image is obtained. The to-be-recognized image is generated by capturing a plurality of people, to perform multi-person pose recognition on the to-be-recognized image including the plurality of people.

The to-be-recognized image may be from an image acquired in real time by a recognition terminal. For example, the recognition terminal is a smartphone, and the smartphone is configured with a camera. The to-be-recognized image may alternatively be an image that is pre-stored on the recognition terminal. For example, the recognition terminal is a server, and the image is obtained through local reading or network transmission.

In other words, for the multi-person pose recognition apparatus deployed on the recognition terminal, the to-be-recognized image acquired in real time may be obtained, to perform the multi-person pose recognition on the to-be-recognized image in real time. The to-be-recognized image acquired in a historical period of time may further be obtained, to perform the multi-person pose recognition on the to-be-recognized image when there are few processing tasks, or, to perform the multi-person pose recognition on the to-be-recognized image under an instruction of an operator. Thus, the descriptions of obtaining the to-be-recognized image made herein are merely exemplary and not limiting upon the present disclosure.

Further, for a camera component configured for the recognition terminal, if the camera component may be used as an independent device, for example, a camera, a video recorder, or the like, the independent device may be placed around an environment in which a plurality of people are located, so that the plurality of people may be captured from different angles, and the to-be-recognized image reflecting the plurality of people from different angles is obtained, thereby helping ensure the precision of the subsequent pose recognition.

The capturing may be single capturing or continuous capturing. Correspondingly, for the single capturing, the obtained image is the to-be-recognized image, that is, a picture, and for the continuous capturing, a video including several to-be-recognized images is obtained. Therefore, in the exemplary embodiments of the present disclosure, the to-be-recognized image on which the multi-person pose recognition is performed may be a picture obtained through single capturing, or a to-be-recognized image in a video obtained through continuous capturing. Other methods of capturing the to-be-recognized image are also possible without departing from the scope of the present disclosure.

In step 320, a circuitous pyramid network is constructed. The circuitous pyramid network includes several phases connected in parallel. Each phase includes layers of a downsampling network, layers of an upsampling network, and a first residual connection layer connected between the layers of the upsampling network and the downsampling network. Different phases are connected through a second residual connection layer.

The circuitous pyramid network includes several phases connected in parallel in a "circuitous" form, and is used for extracting a feature map corresponding to each phase. Specifically, each phase includes the layers of the downsampling network and the layers of the upsampling network. The layers of the downsampling network are used for downsampling processing, to obtain a feature with lower resolution, and reduce the calculation complexity of pose recognition at the same time. The layers of the upsampling network are used for upsampling processing to gradually improve the resolution of the feature, thereby helping ensure the precision of the pose recognition.

In each phase, a first residual connection layer is established between the layers of the downsampling network and the layers of the upsampling network, so that feature propagation can be performed between the layers of the downsampling network and the layers of the upsampling network in the each phase, that is, the features extracted from the layers of the downsampling network are transmitted to the layers of the upsampling network through the first residual connection layer, and feature fusion is further performed, to obtain a feature map corresponding to each phase.

As shown in FIG. 4, the circuitous pyramid network includes a phase 0, a phase 1, a phase 2, and so on. The phase 0 is used for description. The phase 0 includes layers of a downsampling network 401 and layers of an upsampling network 402. In ascending order of network levels, the network layers are respectively a network layer 4051, a network layer 4052, a network layer 4053, and a network layer 4054.

For different phases, a second residual connection layer is established between the layers of the upsampling network in a current phase and the layers of the downsampling network in a next phase, so that the feature propagation is performed between the different phases. Then, extraction may be performed on a corresponding feature map in the next phase based on the feature propagation. As shown in FIG. 4, between the layers of the upsampling network 402 in the phase 0 and the layers of the downsampling network 409 in the phase 1, feature propagation is performed through a plurality of second residual connection layers 404 respectively.

In step 330, the phases of the circuitous pyramid network are traversed, and traversal of the phases includes the processing in the following step 340 and the following step 350.

In step 340, feature propagation between the layers of the downsampling network and the layers of the upsampling network in the current phase is performed through the first residual connection layer. During feature map extraction performed on a current phase, an output feature map of the current phase is obtained. As shown in FIG. 4, between the layers of the downsampling network 401 and the layers of the upsampling network 402, corresponding feature propagation is performed through a plurality of layers of the first residual connection layer 403 respectively. Therefore, an output feature map 406 of the phase 0 may be outputted through the circuitous pyramid network.

In step 350, feature propagation between the layers of the upsampling network in the current phase and the layers of the downsampling network in a next phase is performed through the second residual connection layer, to extract a feature map corresponding to the next phase. In the phase 1, an output feature map 412 of the phase 1 may be obtained through feature extraction performed by the layers of the downsampling network 409, the feature propagation performed by the first residual connection layer 411, and the feature fusion performed by the layers of the upsampling network 410. The phases in the circuitous pyramid network are traversed, and a feature map corresponding to each phase may be obtained correspondingly. An output feature map of a last phase is used as a feature map corresponding to the to-be-recognized image, until traversal of the phases in the circuitous pyramid network is completed.

It can be learned from the above that, based on the circuitous pyramid network, the feature propagation depends on the first residual connection layer and the second residual connection layer, and use of a convolution operation is avoided, thereby avoiding the problem of the bottleneck of the feature propagation. In addition, in the same phase, the feature fusion is performed through the upsampling network, and between different phases, the output feature map of the current phase is used as an input of the next phase, which means that in the circuitous pyramid network, the features with different resolutions and different scales are mutually associated, not isolated, thereby effectively improving the precision of the pose recognition.

In step 360, multi-person pose recognition is performed according to the feature map corresponding to the to-be-recognized image, to obtain a pose recognition result of the to-be-recognized image. Through the foregoing process, the pose recognition implemented based on the circuitous pyramid network not only meets the precision requirement of the pose recognition, but also the feature propagation is performed through a formed convenient jump shortcut, so that the problem of the bottleneck of the feature propagation is effectively resolved, thereby helping improve propagation effectiveness of the feature in the circuitous pyramid network.

Referring to FIG. 5, in an exemplary embodiment, the traversed phase is used as a current phase, and step 340 may include the following steps. In step 331, feature extraction on an input feature map of the current phase is performed through the layers of the downsampling network. The downsampling network includes several high network layers and several low network layers.

Figure 6:
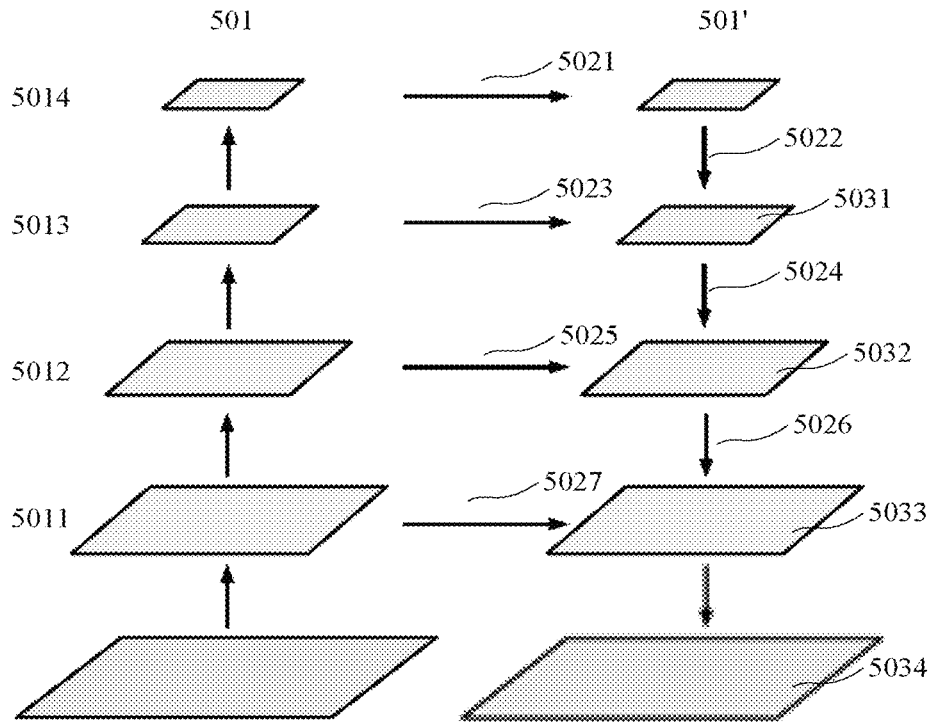
FIG. 6 is a schematic structural diagram of a current phase in a circuitous pyramid network according to the exemplary embodiment corresponding to FIG. 5.

With reference to FIG. 6, a process of feature extraction performed in the current phase is described. A feature map inputted to the current phase is an input feature map, and the output feature map is obtained after the current phase is processed.

As shown in FIG. 6, the current phase includes a downsampling network 501 and an upsampling network 501'. The downsampling network 501 includes low network layers 5011 and 5012 and high network layers 5013 and 5014.

Through the low network layers 5011 and 5012 in the downsampling network 501, several local features of the input feature map are obtained through extraction, each of the local features corresponding to a low network layer. Through the high network layers 5013 and 5014 in the downsampling network 501, global features of the input feature map are obtained through extraction, each of the global features corresponding to a high network layer. That is, in the current phase, with the deepening of a network level, in the feature extraction of the to-be-recognized image, the local feature description is gradually abstracted into the global feature description, thereby describing the to-be-recognized image more accurately, and helping improve the precision of the pose recognition.

Description is provided by using an example in which the to-be-recognized image includes a plurality of people. The local feature, also understood as a semantic feature, is an accurate description of key parts of a human body such as eyes, a nose, ears, a mouth, shoulders, elbows, wrists, hip-joints, knees, ankles and the like, while the global feature is an accurate description of a human body outline.

In step 333, an extracted feature is transmitted from the layers of the downsampling network to the layers of the upsampling network, and feature fusion is performed on the layers of the upsampling network to obtain the output feature map.

After the feature extraction is completed by the layers of the downsampling network, the feature fusion needs to be completed through the layers of the upsampling network. Specifically, in the layers of the upsampling network, the following processing is performed on the layers according to a descending order of network levels fusing a feature received from the previous residual connection layer with a feature transmitted from a previous layer, performing upsampling processing on a feature obtained after the fusion, and transmitting the processed fused feature to a next layer; and using a processed fused feature obtained in a last layer as the output feature map.

With reference to FIG. 6, the feature fusion process in the current phase is described as follows. Feature propagation is performed between the layers of the downsampling network 501 and the layers of the upsampling network 501' in the current phase through the first residual connection layers 5021, 5023, 5025 and 5027 respectively. In the layers of the upsampling network 501', upsampling processing is performed on a feature corresponding to the highest layer 5014 of the network to obtain a to-be-fused feature 5022.

After a feature corresponding to a second highest layer 5013 of the network is transmitted to an upsampling network layer 5031 through the first residual connection layer 5023, the feature is fused with the to-be-fused feature 5022. Upsampling processing is performed on a feature obtained after fusion, and updating processing on the feature obtained after fusion is completed, and then a feature 5024 obtained after fusion processing is transmitted to a next layer 5032.

Similarly, upsampling processing is performed on the updated fused feature 5032, to obtain a feature 5026. The feature 5026 and a feature that is corresponding to a network layer 5011 are transmitted to an upsampling network layer 5033 through the first residual connection layer 5027 for fusion, and then upsampling processing is performed. Until the traversal of corresponding features of other layers of the network is completed, the processed fused feature obtained in a last layer 5034 is used as the output feature map of the current phase.

It is worth mentioning that, a resolution of the output feature map that is obtained through the foregoing processing and that is of the current phase is only ½ of the resolution of the to-be-recognized image. According to actual needs of different application scenarios, in order to facilitate subsequent pose recognition, interpolation needs to be performed on the feature map corresponding to the current phase, so that the resolution of the output feature map of the current phase can be consistent with the resolution of the to-be-recognized image.

Through the foregoing exemplary embodiments, the upsampling processing and the downsampling processing are performed repeatedly, so that the calculation complexity of the pose recognition is reduced, the network receptive field is enlarged, and the precision of the pose recognition is fully ensured.

Figure 7:
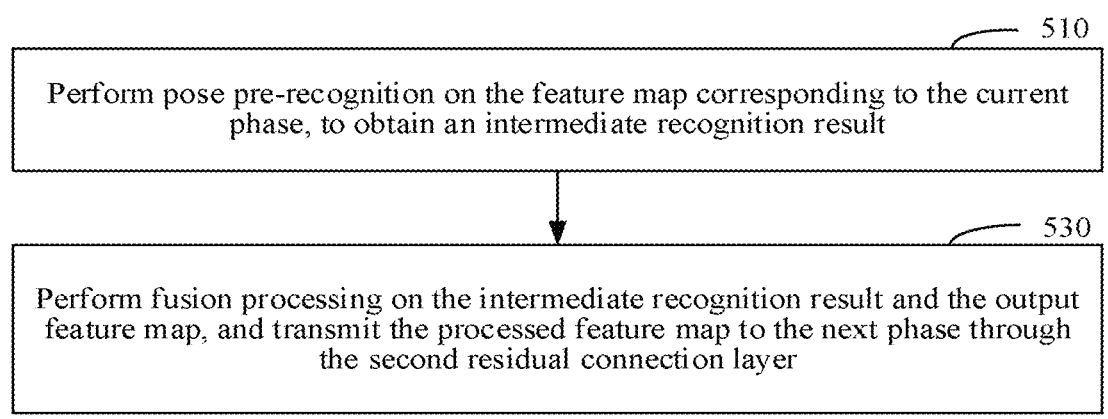
FIG. 7 is a flowchart of another multi-person pose recognition method according to an exemplary embodiment of the present disclosure.

Referring to FIG. 7, in an exemplary embodiment, after step 340, the foregoing method may further include the following steps.

In step 510, pose pre-recognition is performed on the feature map corresponding to the current phase, to obtain an intermediate recognition result. In step 530, fusion processing is performed on the intermediate recognition result and the output feature map, and the processed feature map is transmitted to the next phase through the second residual connection layer.

In order to enable the circuitous pyramid network to learn a higher-level semantic feature as early as possible, in the exemplary embodiment, intermediate supervision is performed on the feature map corresponding to each phase, so that a deviation of an intermediate phase in a pose recognition process is corrected.

The intermediate supervision includes performing the pose pre-recognition on the feature map corresponding to the current phase, so that the obtained intermediate recognition result is close to a specified intermediate supervision signal. The intermediate supervision signal is set in a network training process of the circuitous pyramid network, for example, the intermediate supervision signal may be a loss value of a loss function.

Referring back to FIG. 4, an intermediate prediction process is described by using an example in which the current phase is the phase 0. As shown in FIG. 4, it is assumed that after feature fusion is performed on the layers of the upsampling network 402, the feature map 4071 corresponding to phase 0 is initially obtained.

An intermediate recognition result 4072 is further obtained through the pose pre-recognition. Through comparison with an intermediate supervision signal 4074, the intermediate recognition result 4072 is constrained to be close to the given intermediate supervision signal 4074, and the intermediate recognition result 4072 is further fused with the feature map 4071 corresponding to phase 0, that is, as shown by 4073 in FIG. 4, the output feature map 406 of the phase 0 is finally formed, and is used as an input feature map of the phase 1.

In the exemplary embodiment, and in combination with the intermediate supervision, the circuitous pyramid network is enabled to learn the higher-level semantic feature as early as possible, and with the traversal of the phases, the intermediate recognition result is continuously fused into the circuitous pyramid network, to repeatedly optimize the circuitous pyramid network to make up for deficiencies of the intermediate recognition result, thereby making up for the deviation in the intermediate phase of the pose recognition process, and further fully ensuring the precision of the pose recognition.

In an exemplary embodiment, it is to be understood that, the manner of the feature propagation process performed through the first residual connection layer is the same as the manner of the feature propagation process performed through the second residual connection layer, and the only difference is that processing layers on two sides connected to the first residual connection layer and the second residual connection layer are different. In this case, to better describe commonalities of the feature propagation process below, the following definitions of the first residual connection layer and the second residual connection layer are described.

Correspondingly, the foregoing method may further construct a propagation path for the circuitous pyramid network. The propagation path includes a path corresponding to each layer in a case that the feature propagation is performed through the layers in the first residual connection layer and/or the second residual connection layer.

Figure 8:
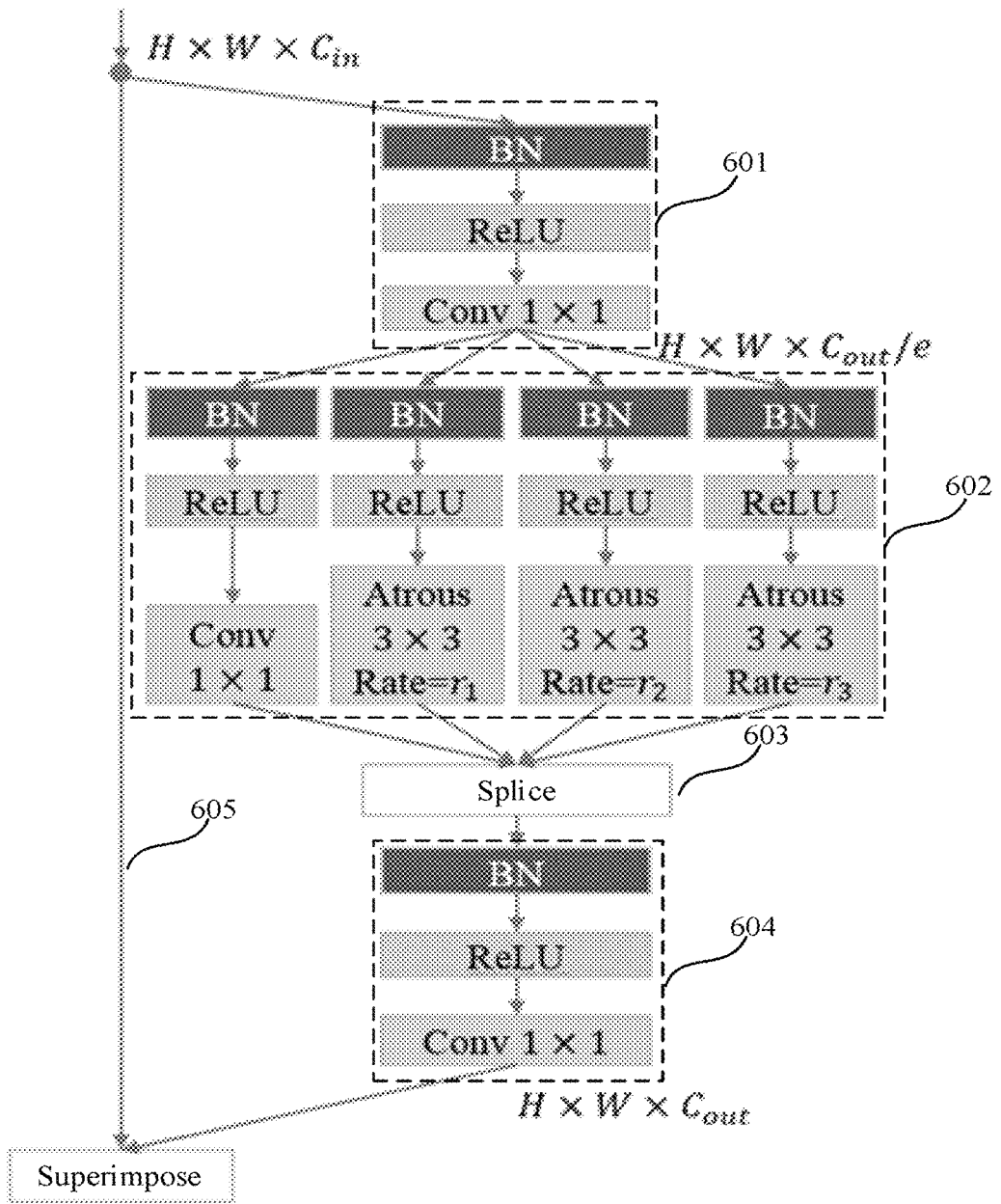
FIG. 8 is a schematic structural diagram of a propagation path constructed for a circuitous pyramid network according to the exemplary embodiment corresponding to FIG. 7.

With reference to FIG. 8, the process of the feature propagation performed through the propagation path is described. Specifically, dimensional compression is performed on a to-be-propagated feature through a feature compression unit 601, that is, a dimension of the input feature map is compressed from H×W×C_in into H×W×C_out/e, so that the calculation complexity on the propagation path is reduced, and the volume of calculation in the feature propagation process is reduced. The feature compression unit 601 includes: a normalization layer (BN), an activation layer (ReLU) and a convolutional layer (Conv 1×1) connected in sequence.

The compressed feature is inputted to a multi-channel (for example, four-channel) parallel atrous convolution pyramid unit 602, and feature splicing is performed through a splicing unit 603, so that feature loss in the process of feature propagation can be avoided while network receptive field is enlarged, and propagation effectiveness of the feature in the process of the feature propagation is effectively ensured, thereby avoiding the problem of the bottleneck of the feature propagation. Each channel of the atrous convolution pyramid unit 602 includes a normalization layer (BN), an activation layer (ReLU) and a convolutional layer (Cony 1×1) or an atrous convolutional layer (Atrous 3×3).

Dimensional expansion is performed on the spliced feature through a feature expansion unit 604, and the feature dimension H×W×C_out before compression is restored from the dimension H×W×C_out/e. The feature expansion unit 604 includes: a normalization layer (BN), an activation layer (ReLU) and a convolutional layer (Cony 1×1) connected in sequence.

It is worth mentioning that, in the circuitous pyramid network, both the first residual connection layer and the second residual connection layer introduce the pre-activation technology, thereby helping improve the precision of the pose recognition.

Through the foregoing process, rapid propagation of the features in the same phase and different phases in the circuitous pyramid network is implemented through the propagation path, and is conducive to extraction of the feature maps corresponding the phases, so that not only the difficulty of learning the same scale feature during pose recognition in the solution of bottom-up recognition is reduced, but also the precision of the pose recognition is effectively improved, and the precision of the pose recognition in the embodiments of this application reaches more than 70.2%, which is better than the 65.6% precision that can be achieved by the stacked hourglass network provided in the related art.

Further, as shown in FIG. 8, the propagation path further includes an inter-phase jump path 605. Specifically, an inter-phase jump path is established between the phases of the circuitous pyramid network, and is added to the propagation path.

Referring back to FIG. 4, in the phase 0, through the inter-phase jump path 408, the to-be-recognized image may be fused to the phase 0 in the circuitous pyramid network without any operation, or through a convolution operation of an original scale only.

In other words, the inter-phase jump path may be considered as an identity mapping path, to ensure that the circuitous pyramid network can be easily trained in the network training process, so that the difficulty of the network training process is reduced.

Figure 9:
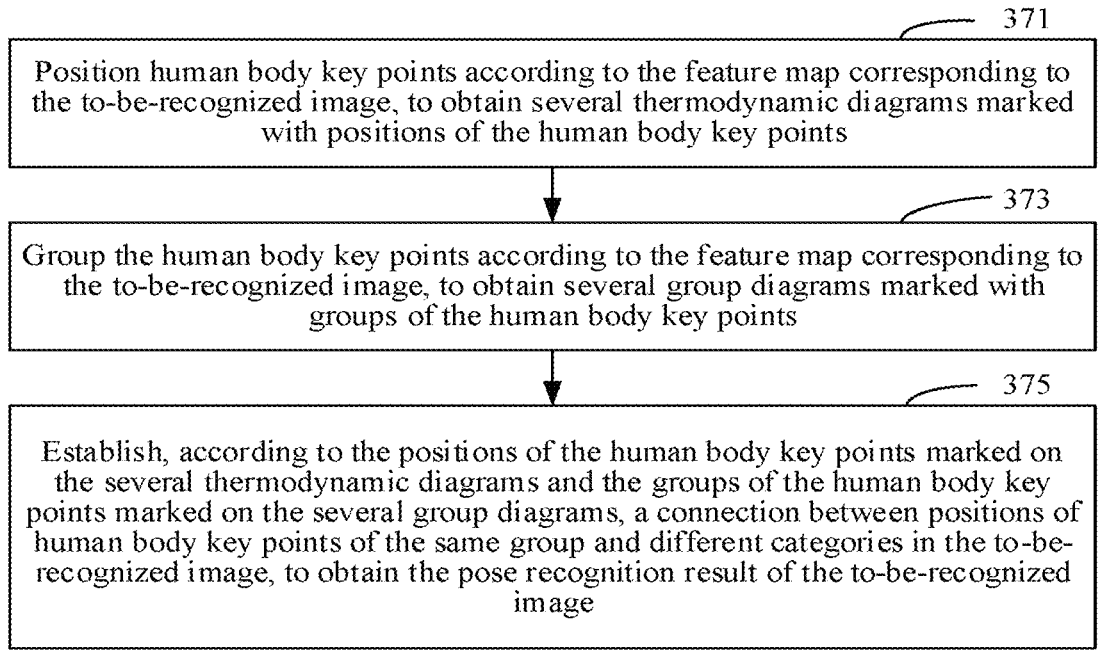
FIG. 9 is a flowchart of step 360 in the exemplary embodiment corresponding to FIG. 3.
Figure 10:
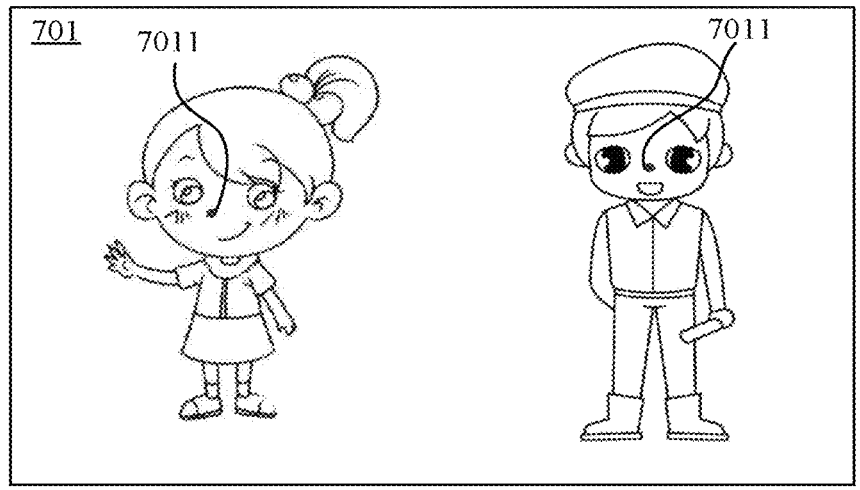
FIG. 10 is a schematic diagram of a thermodynamic diagram marked with a position of a nose key point according to the exemplary embodiment corresponding to FIG. 9.

Referring to FIG. 9, in an exemplary embodiment, step 360 may include the following steps. In step 371, human body key points are positioned according to the feature map corresponding to the to-be-recognized image, to obtain several thermodynamic diagrams marked with positions of the human body key points, each thermodynamic diagram corresponding to human body key points of one category The human body key points are key positions of the human body, including a nose, shoulders, wrists, elbows, hip-joints, knees, ankles and the like. Correspondingly, the category is the type of the human body key point, for example, a wrist key point and a nose key point are regarded as belonging to different categories. Then, for different categories, several human body key points in the to-be-recognized image and positions thereof are different. Therefore, a thermodynamic diagram corresponding to a category is used for marking the positions of the human body key points of the category in the to-be-recognized image, and is obtained by positioning the human body key points on the feature map corresponding to the to-be-recognized image. For example, the to-be-recognized image includes two people. As shown in FIG. 10, a thermodynamic diagram 701 corresponding to the category of nose key points is used for marking the positions of the nose key points 7011 of two different people in the to-be-recognized image.

Figure 11:
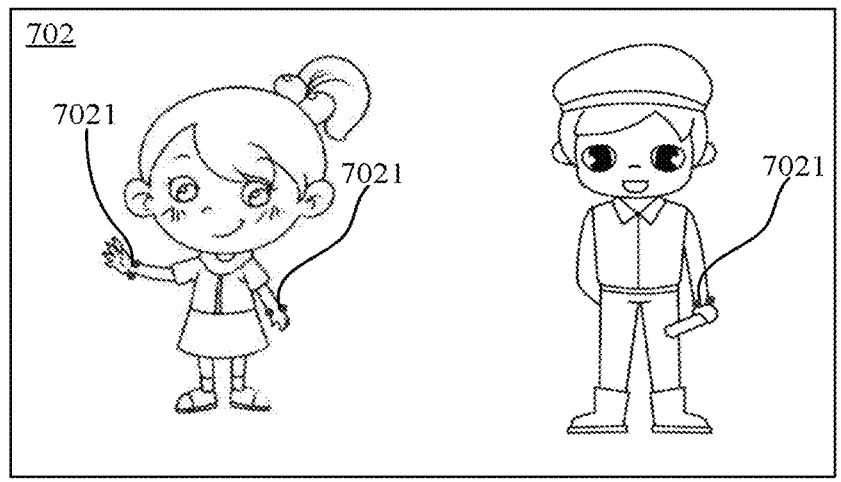
FIG. 11 is a schematic diagram of a thermodynamic diagram marked with a position of a wrist key point according to the exemplary embodiment corresponding to FIG. 9.

As shown in FIG. 11, a thermodynamic diagram 702 of the category of wrist key points is marked with the positions of the wrist key points 7021 of two different people in the to-be-recognized image are marked. In an exemplary embodiment, positioning of the human body key points is implemented based on a classifier implemented by the circuitous pyramid network, that is, the classifier is used for calculating a probability that the human body key points appear in different positions in the to-be-recognized image.

Specifically, for a category, a probability that the human body key points of the category appear in different positions in the to-be-recognized image is calculated according to the feature map corresponding to the to-be-recognized image. A thermodynamic diagram corresponding to the category is generated by using the probability obtained through calculation as a thermodynamic value. That is, a larger thermodynamic value of a position in the thermodynamic diagram indicates a larger probability that a human body key point of the category appears in the corresponding location in the to-be-recognized image.

In step 373, the human body key points are grouped according to the feature map corresponding to the to-be-recognized image, to obtain several group diagrams marked with groups of the human body key points, each group diagram corresponding to human body key points of one category. The group diagram corresponding to the category is used for marking groups of the human body key points of the category.

In an exemplary embodiment, grouping of the human body key points is also implemented by the classifier implemented by the circuitous pyramid network, that is, the classifier is used for calculating a probability that the human body key points belong to different groups. Specifically, for a category, a probability that human body key points of the category belong to different groups is calculated according to the feature map corresponding to the to-be-recognized image.

The group to which the human body key points of the category belong is determined according to the probability obtained through calculation. That is, a larger probability obtained through calculation indicates a larger probability that the human body key points of the category belong to the group. For example, a probability that the human body key points of a category A belong to a group B1 is P1, and a probability that the human body key points of the category A belong to a group B2 is P2. If P1>P2, it indicates that the human body key points of the category A belong to the group B1. Otherwise, if P1<P2, it indicates that the human body key points in the category A belong to the group B2.

The to-be-recognized image is marked according to the determined group, and a group diagram corresponding to the category is generated. That is, in the group diagram corresponding to the category, different marks represent different groups to which the human body key points belong, that is, different marks indicate that the human body key points belong to different people in the group diagram. The mark may be a color, a line form (for example, a dashed line or a solid line), or the like. This is not specifically limited in this embodiment herein.

Figure 12:
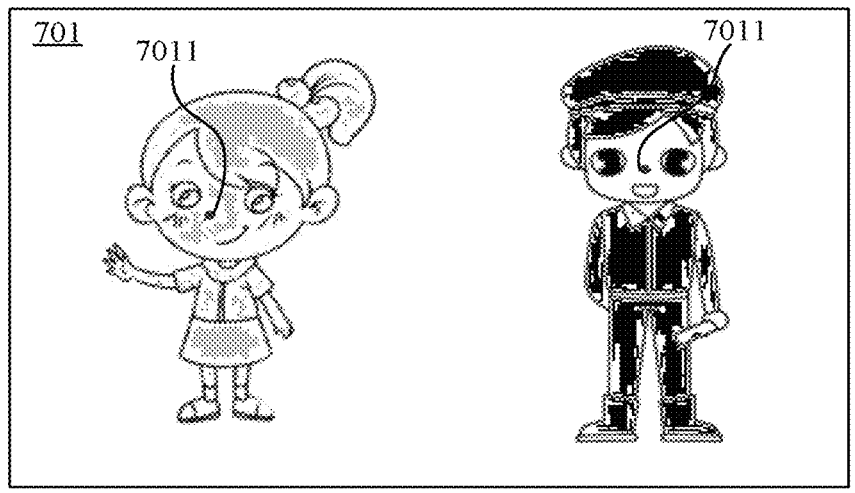
FIG. 12 is a schematic diagram of a group diagram marked with a group of a nose key point according to the exemplary embodiment corresponding to FIG. 9.

The to-be-recognized image including two people (that is, there are two groups: girls and boys) is still used as an example. As shown in FIG. 12, a nose key point 7011 in a group diagram 701 belongs to a girl, who is marked gray, and the nose key point 7011 in the group diagram 701 belongs to a boy, who is marked black.

Figure 13:
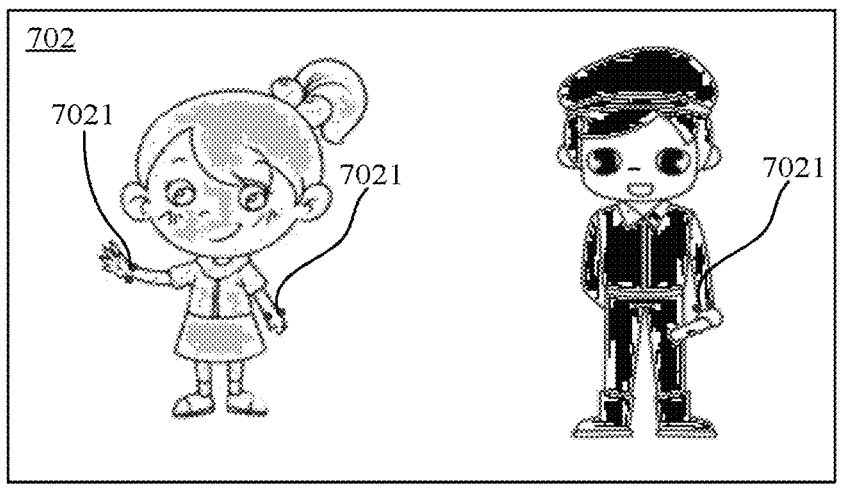
FIG. 13 is a schematic diagram of a group diagram marked with a group of a wrist key point according to the exemplary embodiment corresponding to FIG. 9.

As shown in FIG. 13, a wrist key point 7021 in a group diagram 702 belongs to a girl, who is marked gray, and the wrist key point 7021 in the group diagram 702 belongs to a boy, who is marked black.

There is no sequence in which step 371 and step 373 are performed. For the circuitous pyramid network, the thermodynamic diagram and the group diagram are outputted at the same time.

In step 375, a connection between positions of human body key points of the same group and different categories in the to-be-recognized image is established according to the positions of the human body key points marked on the several thermodynamic diagrams and the groups of the human body key points marked on the several group diagrams, to obtain the pose recognition result of the to-be-recognized image.

After the thermodynamic diagrams and the group diagrams are obtained, the connection may be established in the to-be-recognized image between the positions of the human body key points belonging to the same group, that is, the same person, and belonging to different categories according to a specified connection relationship, so that the pose recognition result of the to-be-recognized image is obtained.

Figure 14:
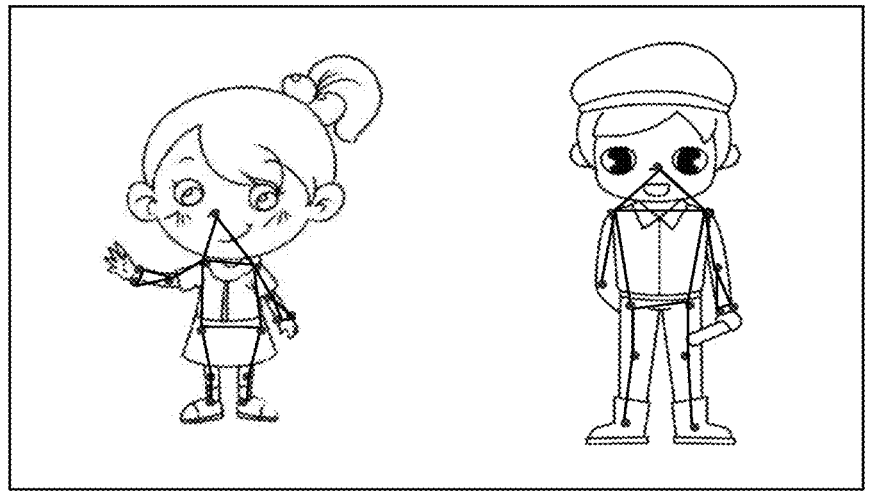
FIG. 14 is a schematic diagram of a pose recognition result of a to-be-recognized image according to the exemplary embodiment corresponding to FIG. 9.

For example, as shown in FIG. 14, for each person, a connection is established between positions of the human body key points such as a nose key point, a shoulder key point, a wrist key point, an elbow key point, a hip-joint key point, a knee key point, and an ankle key point in the to-be-recognized image, so that the pose recognition result of the to-be-recognized image is obtained. It may also be understood that, the pose recognition result reflects the connection relationship between the human body key points included in each person in the to-be-recognized image, and the pose of the corresponding human body is indicated through the connection relationship.

Through the foregoing process, with reference to the thermodynamic diagram and the group diagram, the multi-person pose recognition based on the circuitous pyramid network can not only determine the positions of the human body key points of different individuals in the to-be-recognized image, but also determine different groups to which the human body key points of different individuals belong in the to-be-recognized image, thereby greatly improving processing efficiency of the pose recognition, especially the processing efficiency of the multi-person pose recognition.

It is supplemented herein that, in the network training process of the circuitous pyramid network, the positioning information of the human body key points and the group information of the human body key points are used as a supervision signal to participate in the network training, to ensure that the circuitous pyramid network can position and group the human body key points at the same time after the network training is completed, thereby ensuring the processing efficiency of the pose recognition.

The position information of human body key points is related to a to-be-recognized image sample marked with the positions of the human body key points of different categories. The group information of the human body key points is related to the to-be-recognized image sample marked with the groups to which the human body key points of different categories belong.

Figure 15:
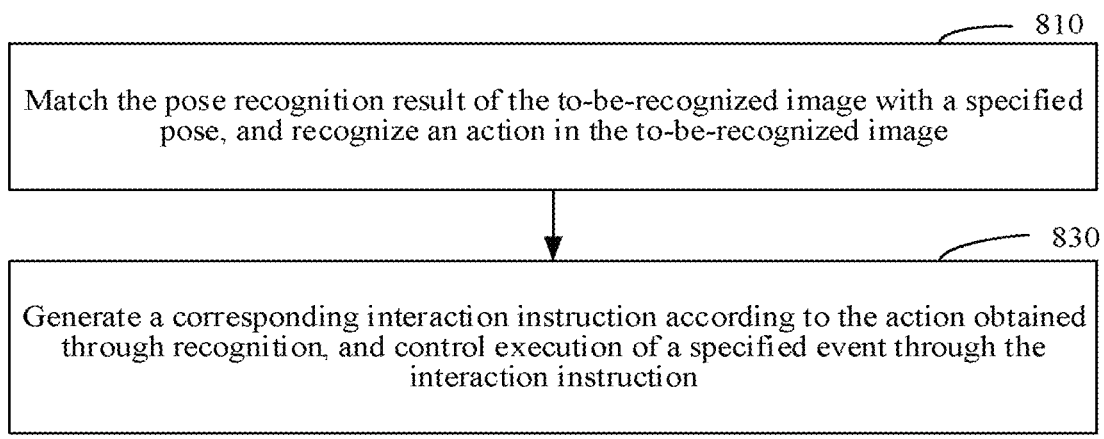
FIG. 15 is a flowchart of another multi-person pose recognition method according to an exemplary embodiment of the present disclosure.

Referring to FIG. 15, in an exemplary embodiment, after step 360, the foregoing method may further include the following steps. In step 810, the pose recognition result of the to-be-recognized image is matched with a specified pose, and an action in the to-be-recognized image is recognized. In step 830, a corresponding interaction instruction is generated according to the action obtained through recognition, and execution of a specified event is controlled through the interaction instruction. In an application scenario, the recognition terminal is a smart TV, and the interaction terminal is a somatosensory device.

An interaction application, for example, a double tennis somatosensory game client, that is, a pose recognition apparatus, is deployed on a smart TV. As the interaction application runs on the smart TV, a tennis game scene is displayed to a user through a display screen configured for the smart TV.

If the user performs a racket swinging action through a tennis racket somatosensory device, the interaction application running on the smart TV performs the multi-person pose recognition on the acquired to-be-recognized image. If the user pose indicated by the pose recognition result matches with a specified racket swinging pose, the racket swinging action performed by the user is recognized.

Further, the interaction application may generate, through the foregoing recognition, an interaction instruction indicating that the user has performed a racket swinging action, thereby controlling the smart TV to perform a display event.

Specifically, in the tennis game scene displayed by the display screen, a virtual user role in the tennis game scene is controlled according to the interaction instruction to perform the corresponding racket swinging action, thereby implementing somatosensory interaction between the user and the somatosensory device.

In the foregoing application scenario, a pose recognition service provides a basis for the interaction application based on human body poses, thereby greatly enriching entertainment experience of the user.

The following is an apparatus embodiment of this application that may be used for performing the multi-person pose recognition method of this application. For details that are not disclosed in this apparatus embodiment of this application, refer to the method embodiment of the multi-person pose recognition method in this application.

Figure 16:
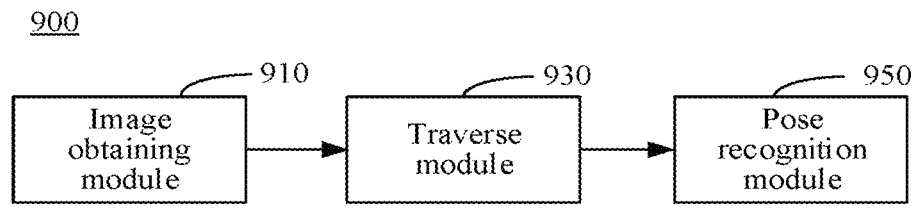
FIG. 16 is a block diagram of a multi-person pose recognition apparatus according to an exemplary embodiment of the present disclosure.

Referring to FIG. 16, in an exemplary embodiment, a multi-person pose recognition apparatus 900 includes, but not limited to, an image obtaining module 910, a traverse module 930 and a pose recognition module 950. One or more of these modules may be implemented by processing circuitry, for example.

The image obtaining module 910 is configured to obtain a to-be-recognized image, and the traverse module 930 is configured to construct a circuitous pyramid network. The circuitous pyramid network includes several phases connected in parallel, and each phase includes layers of a downsampling network, layers of an upsampling network, and a first residual connection layer connected between the layers of the upsampling network and the downsampling network. Different phases are connected through a second residual connection layer.

The traverse module 930 is further configured to traverse the phases of the circuitous pyramid network, by performing, during feature map extraction performed in a current phase, feature propagation between the layers of the downsampling network and the layers of the upsampling network in the current phase through the first residual connection layer, to obtain an output feature map of the current phase, and by performing feature propagation between the layers of the upsampling network in the current phase and the layers of the downsampling network in a next phase through the second residual connection layer, to extract a feature map corresponding to the next phase. The traverse module 930 is further configured to use an output feature map of a last phase as a feature map corresponding to the to-be-recognized image, until traversal of the phases in the circuitous pyramid network is completed.

The pose recognition module 950 is configured to perform pose recognition according to the feature map corresponding to the to-be-recognized image, to obtain a pose recognition result of the to-be-recognized image. In an exemplary embodiment, the traverse module 930 includes, but not limited to a feature extraction unit and a feature fusion unit. The feature extraction unit is configured to perform feature extraction on an input feature map of the current phase through the layers of the downsampling network. The feature fusion unit is configured to transmit, through the first residual connection layer, an extracted feature from the layers of the downsampling network to the layers of the upsampling network, and perform feature fusion on the layers of the upsampling network to obtain the output feature map.

In an exemplary embodiment, the downsampling network includes several high network layers and several low network layers. The feature extraction unit includes, but not limited to, a local feature extraction subunit and a global feature extraction subunit.

The local feature extraction subunit is configured to extract several local features of the input feature map through the several low network layers, each of the local features corresponding to a low network layer. The global feature extraction subunit is configured to extract several global features of the input feature map through the several high network layers, each of the global features corresponding to a high network layer.

In an exemplary embodiment, the feature fusion unit includes, but not limited to, a fusion subunit and a feature map obtaining subunit. The fusion subunit is configured to perform, in the layers of the upsampling network, fusing of a feature received from the previous residual connection layer with a feature transmitted from a previous layer, performing upsampling processing on a feature obtained after the fusion, and transmitting the processed fused feature to a next layer. The feature map obtaining subunit is configured to use a processed fused feature obtained in a last layer as the output feature map.

In an exemplary embodiment, the apparatus 900 further includes, but is not limited to, a pre-recognition module and a result fusion module. The pre-recognition module is configured to perform pose pre-recognition on the output feature map, to obtain an intermediate recognition result. The result fusion module is configured to perform fusion processing on the intermediate recognition result and the output feature map, and transmit the processed feature map to the next phase through the second residual connection layer.

In an exemplary embodiment, the apparatus 900 further includes, but not limited to, a propagation path constructing module, configured to construct a propagation path for the circuitous pyramid network. The propagation path includes a path corresponding to each layer in a case that the feature propagation is performed through the layers in the first residual connection layer and/or the second residual connection layer.

Specifically, the propagation path constructing module includes, but not limited to, a feature compression unit, an atrous convolution unit and a feature expansion unit. The feature compression unit is configured to perform dimensional compression on a to-be-propagated feature. The atrous convolution unit is configured to input the compressed feature to a multi-channel parallel atrous convolution pyramid unit, and splice the feature through a splicing unit. The feature expansion unit is configured to perform dimensional expansion on the spliced feature, to restore a feature dimension during propagation.

Further, the feature compression unit and the feature expansion unit both include a normalization layer, an activation layer and a convolutional layer that are sequentially connected. In an exemplary embodiment, the propagation path constructing module further includes, but is not limited to, a jump path establishing unit. The jump path establishing unit is configured to establish an inter-phase jump path among the phases of the circuitous pyramid network, and add the inter-phase jump path to the propagation path.

In an exemplary embodiment, the pose recognition module 950 includes, but not limited to, a thermodynamic diagram obtaining unit, a group diagram obtaining unit and a key point position connecting unit. The thermodynamic diagram obtaining unit is configured to position human body key points according to the feature map corresponding to the to-be-recognized image, to obtain several thermodynamic diagrams marked with positions of the human body key points. Each thermodynamic diagram corresponds to human body key points of one category. The group diagram obtaining unit is configured to group the human body key points according to the feature map corresponding to the to-be-recognized image, to obtain several group diagrams marked with groups of the human body key points. Each group diagram corresponds to human body key points of one category. The key point position connecting unit is configured to establish, according to the positions of the human body key points marked on the several thermodynamic diagrams and the groups of the human body key points marked on the several group diagrams, a connection between positions of human body key points of the same group and different categories in the to-be-recognized image, to obtain the pose recognition result of the to-be-recognized image.

In an exemplary embodiment, the thermodynamic diagram obtaining unit includes, but not limited to, a position probability calculation subunit and a thermodynamic diagram generation subunit. The position probability calculation subunit is configured to, for a category, calculate, according to the feature map corresponding to the to-be-recognized image, a probability that human body key points of the category appear in different positions in the to-be-recognized image. The thermodynamic diagram generation subunit is configured to generate a thermodynamic diagram corresponding to the category by using the probability obtained through calculation as a thermodynamic value.

In an exemplary embodiment, the group diagram obtaining unit includes, but is not limited to, a group probability calculation subunit, a group determining subunit and a group diagram generation subunit. The group probability calculation subunit is configured to, for a category, calculate, according to the feature map corresponding to the to-be-recognized image, a probability that human body key points of the category belong to different groups. The group determining subunit is configured to determine, according to the probability obtained through calculation, a group to which the human body key points of the category belong. The group diagram generation subunit is configured to mark the to-be-recognized image according to the determined group, and generate a group diagram corresponding to the category.

In an exemplary embodiment, the apparatus 900 further includes, but is not limited to, an action recognition module and a control interaction module. The action recognition module is configured to match the pose recognition result of the to-be-recognized image with a specified pose, and recognize an action in the to-be-recognized image. The control interaction module is configured to generate a corresponding interaction instruction according to the action obtained through recognition, and control execution of a specified event through the interaction instruction.

When the multi-person pose recognition apparatus provided in the foregoing exemplary embodiment performs multi-person pose recognition processing, the division of the functional modules is merely used as an example for description. In the practical application, the functions may be distributed to and implemented differently than described herein, according to different requirements, without departing from the scope of the present disclosure. Thus, the division of the internal structure of the multi-person pose recognition apparatus into the different functional modules described herein is merely exemplary and does not limit the present disclosure.

In addition, the multi-person pose recognition apparatus provided in the foregoing exemplary embodiment and the exemplary embodiments of the multi-person pose recognition method may be combined without limitation. Therefore, to the extent that description of a feature is omitted in one exemplary embodiments, such omission is merely for the sake of brevity, and not because the feature cannot be incorporated into that exemplary embodiment.

Figure 17:
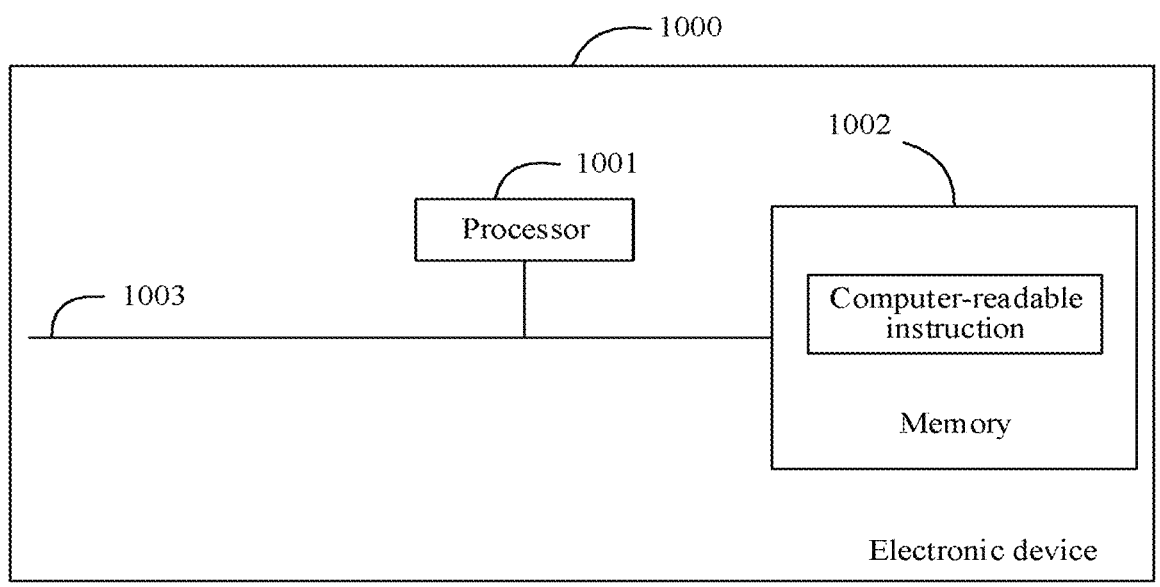
FIG. 17 is a block diagram of an electronic device according to an exemplary embodiment of the present disclosure.

Referring to FIG. 17, in an exemplary embodiment, an electronic device 1000 includes at least one processor 1001, at least one memory 1002 and at least one communication bus 1003. One or more of these components may be implemented by circuitry, for example.

A computer-readable instruction is stored on the memory 1002, and the processor 1001 reads, through the communication bus 1003, the computer-readable instruction stored in the memory 1002. The computer-readable instruction, when executed by the processor 1001, causing the multi-person pose recognition method in the foregoing exemplary embodiments to be implemented.

In an exemplary embodiment, a non-transitory computer-readable storage medium is provided, storing a computer program, the computer program, that when executed by a processor, causes the processor to perform the multi-person pose recognition method in the exemplary foregoing embodiments.

Obviously, numerous modifications and variations of the present invention are possible in light of the above teachings. It is therefore to be understood that within the scope of the appended claims, the invention may be practiced otherwise than as specifically described herein.

What is claimed is:

1. A multi-person pose recognition method, performed by an electronic device, comprising:
    obtaining, by circuitry of the electronic device, a to-be-recognized image;
    constructing, by the circuitry of the electronic device, a circuitous pyramid network, the circuitous pyramid network comprising plural phases connected in parallel, each phase comprising layers of a downsampling network, layers of an upsampling network and a first residual connection layer connected between the layers of the upsampling network and the layers of the downsampling network, and different phases being connected through a second residual connection layer;
    constructing a propagation path for the circuitous pyramid network, the propagation path comprising a path corresponding to each layer for feature propagation through at least one of the first residual connection layer or the second residual connection layer, wherein the constructing the propagation path includes
        performing dimensional compression on a to-be-propagated feature to generate a compressed feature;
        performing a convolution on the compressed feature via a multi-channel parallel atrous convolution pyramid, and splicing the compressed feature to generate a spliced feature; and
        performing dimensional expansion on the spliced feature to restore a feature dimension before the compression;
    traversing, by the circuitry of the electronic device, the plural phases of the circuitous pyramid network, by:
        performing, during feature map extraction performed in a current phase, feature propagation between the layers of the downsampling network and the layers of the upsampling network in the current phase through the constructed propagation path of the first residual connection layer, to obtain an output feature map of the current phase,
        performing feature propagation between the layers of the upsampling network in the current phase and the layers of the downsampling network in a next phase through the constructed propagation path of the second residual connection layer, to extract a feature map corresponding to the next phase;

determining, by the circuitry of the electronic device, an output feature map of a last phase as a feature map corresponding to the to-be-recognized image, until traversal of the phases in the circuitous pyramid network is completed; and performing, by the circuitry of the electronic device, multi-person pose recognition according to the feature map corresponding to the to-be-recognized image, to obtain a pose recognition result for the to-be-recognized image.

2. The method according to claim 1, wherein the performing, during the feature map extraction performed in a current phase, the feature propagation between the layers of the downsampling network and the layers of the upsampling network in the current phase through the first residual connection layer, to obtain an output feature map of the current phase comprises:

performing feature extraction on an input feature map of the current phase through the layers of the downsampling network;

transmitting, through the first residual connection layer, an extracted feature from the layers of the downsampling network to the layers of the upsampling network; and performing feature fusion on the layers of the upsampling network to obtain the output feature map.

3. The method according to claim 2, wherein the downsampling network comprises plural high network layers and plural low network layers below the plural high network layers; and the performing feature extraction on an input feature map of the current phase through the layers of the downsampling network comprises:

extracting local features of the input feature map through the plural low network layers, each of the local features corresponding to one of the plural low network layers; and extracting global features of the input feature map through the plural high network layers, each of the global features corresponding to one of the plural high network layers.

4. The method according to claim 2, wherein the performing feature fusion on the layers of the upsampling network to obtain the output feature map comprises:

performing, in the layers of the upsampling network and according to a descending order of the layers of the upsampling network, fusing of a feature received from a previous residual connection layer with a feature transmitted from a previous layer of the upsampling network to obtain a fused feature, performing upsampling processing on the fused feature to obtain an upsampled fused feature, and transmitting the upsampled fused feature to a next layer; and determining an upsampled fused feature obtained in a last layer as the output feature map.

5. The method according to claim 1, wherein after the performing, during the feature map extraction performed in a current phase, the feature propagation between the layers of the downsampling network and the layers of the upsampling network in the current phase through the constructed propagation path of the first residual connection layer, to obtain an output feature map of the current phase, the method further comprises:

performing pose pre-recognition on the output feature map, to obtain an intermediate recognition result; and performing fusion processing on the intermediate recognition result and the output feature map, and transmitting the feature map after the fusion processing is performed to the next phase through the constructed propagation path of the second residual connection layer.

6. The method according to claim 1, wherein the performing the dimensional compression on the to-be-propagated feature includes passing the to-be-propagated feature through a normalization layer, an activation layer, and a convolutional layer that are sequentially connected, and the performing the dimensional expansion on the spliced feature includes passing the spliced feature through a normalization layer, an activation layer, and a convolutional layer that are sequentially connected.

7. The method according to claim 1, further comprising:

establishing an inter-phase jump path as an identity mapping path that bypasses the constructed propagation path among phases of the circuitous pyramid network.

8. The method according to claim 1, wherein the performing multi-person pose recognition according to the feature map corresponding to the to-be-recognized image, to obtain a pose recognition result of the to-be-recognized image comprises:

positioning human body key points according to the feature map corresponding to the to-be-recognized image, to obtain thermodynamic diagrams marked with positions of the human body key points, each thermodynamic diagram corresponding to human body key points of one category;

grouping the human body key points according to the feature map corresponding to the to-be-recognized image, to obtain group diagrams marked with groups of the human body key points, each group diagram corresponding to human body key points of one category; and establishing, according to the positions of the human body key points marked on the thermodynamic diagrams and the groups of the human body key points marked on the group diagrams, a connection between positions of human body key points of a same group and different categories in the to-be-recognized image, to obtain the pose recognition result of the to-be-recognized image.

9. The method according to claim 8, wherein the positioning the human body key points comprises:

for a category, calculating, according to the feature map corresponding to the to-be-recognized image, a probability that human body key points of the category appear in different positions in the to-be-recognized image; and generating a thermodynamic diagram corresponding to the category by using the probability obtained through calculation as a thermodynamic value.

10. The method according to claim 8, wherein the grouping the human body key points comprises:

for a category, calculating, according to the feature map corresponding to the to-be-recognized image, a probability that human body key points of the category belong to different groups;

determining, according to the probability obtained through calculation, a group to which the human body key points of the category belong; and marking the to-be-recognized image according to the group to which the human body key points of the category belong, and generating a group diagram corresponding to the category.

11. The method according to claim 1, wherein after the performing multi-person pose recognition according to the feature map corresponding to the to-be-recognized image, to obtain a pose recognition result of the to-be-recognized image, the method further comprises:

matching the pose recognition result of the to-be-recognized image with a specified pose, and recognizing an action in the to-be-recognized image; and generating a corresponding interaction instruction according to the action obtained through recognition, and controlling execution of a specified event through the interaction instruction.

12. A multi-person pose recognition apparatus, comprising:

processing circuitry configured to obtain a to-be-recognized image;

construct a circuitous pyramid network, the circuitous pyramid network comprising plural phases connected in parallel, each phase comprising layers of a downsampling network, layers of an upsampling network and a first residual connection layer connected between the layers of the upsampling network and the layers of the downsampling network, and different phases being connected through a second residual connection layer;

construct a propagation path for the circuitous pyramid network, the propagation path comprising a path corresponding to each layer for feature propagation through at least one of the first residual connection layer or the second residual connection layer, the processing circuitry is further configured to perform dimensional compression on a to-be-propagated feature to generate a compressed feature;

perform a convolution on the compressed feature via a multi-channel parallel atrous convolution pyramid, and splice the compressed feature to generate a spliced feature; and perform dimensional expansion on the spliced feature to restore a feature dimension before the compression;

traverse the phases of the circuitous pyramid network, wherein to traverse the phases of the circuitous pyramid network, the processing circuitry is further configured to perform, during feature map extraction performed in a current phase, feature propagation between the layers of the downsampling network and the layers of the upsampling network in the current phase through the constructed propagation path of the first residual connection layer, to obtain an output feature map of the current phase, and perform feature propagation between the layers of the upsampling network in the current phase and the layers of the downsampling network in a next phase through the constructed propagation path of the second residual connection layer, to extract a feature map corresponding to the next phase;

use an output feature map of a last phase as a feature map corresponding to the to-be-recognized image, until traversal of the phases in the circuitous pyramid network is completed; and perform multi-person pose recognition according to the feature map corresponding to the to-be-recognized image, to obtain a pose recognition result for the to-be-recognized image.

13. The multi-person pose recognition apparatus according to claim 12, wherein to perform, during the feature map extraction performed in a current phase, the feature propagation between the layers of the downsampling network and the layers of the upsampling network in the current phase through the first residual connection layer, the processing circuitry is further configured to:

perform feature extraction on an input feature map of the current phase through the layers of the downsampling network;

transmit, through the first residual connection layer, an extracted feature from the layers of the downsampling network to the layers of the upsampling network; and perform feature fusion on the layers of the upsampling network to obtain the output feature map.

14. The multi-person recognition apparatus according to claim 13, wherein the downsampling network comprises plural high network layers and plural low network layers below to the plural high network layers, and to perform feature extraction on an input feature map of the current phase through the layers of the downsampling network, the processing circuitry is further configured to:

extract local features of the input feature map through the plural low network layers, each of the local features corresponding to one of the plural low network layers; and extract global features of the input feature map through the plural high network layers, each of the global features corresponding to one of the plural high network layers.

15. The multi-person pose recognition apparatus of claim 13, wherein to perform feature fusion on the layers of the upsampling network to obtain the feature map, the processing circuitry is further configured to:

perform, in the layers of the upsampling network and according to a descending order of the layers of the upsampling network, fusing of a feature received from a previous residual connection layer with a feature transmitted from a previous layer of the upsampling network to obtain a fused feature, perform upsampling processing on the fused feature to obtain an upsampled fused feature, and transmit the upsampled fused feature to a next layer; and determine an upsampled fused feature obtained in a last layer as the output feature map.

16. A non-transitory computer-readable medium encoded with computer-readable instructions that, when executed by processing circuitry, cause the processing circuitry to perform a method comprising:

obtaining a to-be-recognized image;

constructing a circuitous pyramid network, the circuitous pyramid network comprising plural phases connected in parallel, each phase comprising layers of a downsampling network, layers of an upsampling network and a first residual connection layer connected between the layers of the upsampling network and the layers of the downsampling network, and different phases being connected through a second residual connection layer;

constructing a propagation path for the circuitous pyramid network, the propagation path comprising a path corresponding to each layer for feature propagation through at least one of the first residual connection layer or the second residual connection layer, wherein the constructing the propagation path includes performing dimensional compression on a to-be-propagated feature to generate a compressed feature;

performing a convolution on the compressed feature via a multi-channel parallel atrous convolution pyramid, and splicing the compressed feature to generate a spliced feature; and performing dimensional expansion on the spliced feature to restore a feature dimension before the compression;

traversing the plural phases of the circuitous pyramid network, by:

performing, during feature map extraction performed in a current phase, feature propagation between the layers of the downsampling network and the layers of the upsampling network in the current phase through the constructed propagation path of the first residual connection layer, to obtain an output feature map of the current phase, and performing feature propagation between the layers of the upsampling network in the current phase and the layers of the downsampling network in a next phase through the constructed propagation path of the second residual connection layer, to extract a feature map corresponding to the next phase;

using an output feature map of a last phase as a feature map corresponding to the to-be-recognized image, until traversal of the phases in the circuitous pyramid network is completed; and performing multi-person pose recognition according to the feature map corresponding to the to-be-recognized image, to obtain a pose recognition result for the to-be-recognized image.

* * * * *